April 12, 1960
M. L. SWAN
2,932,547
SEISMIC WAVE RECORDING SYSTEM
Filed June 28, 1955
5 Sheets-Sheet 1
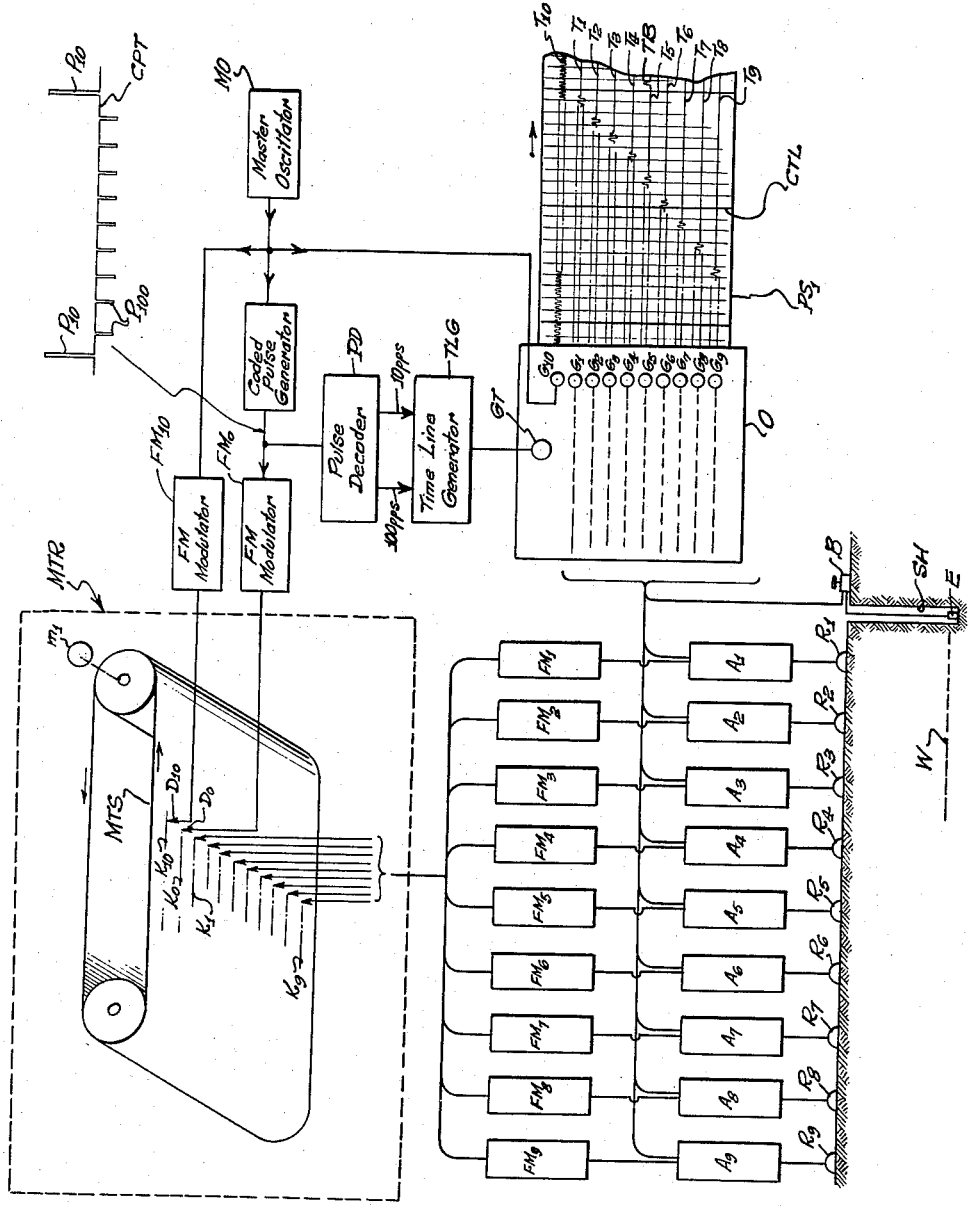
FIG. 1.
MERRILL L. SWAN,
INVENTOR.
ATTORNEY.

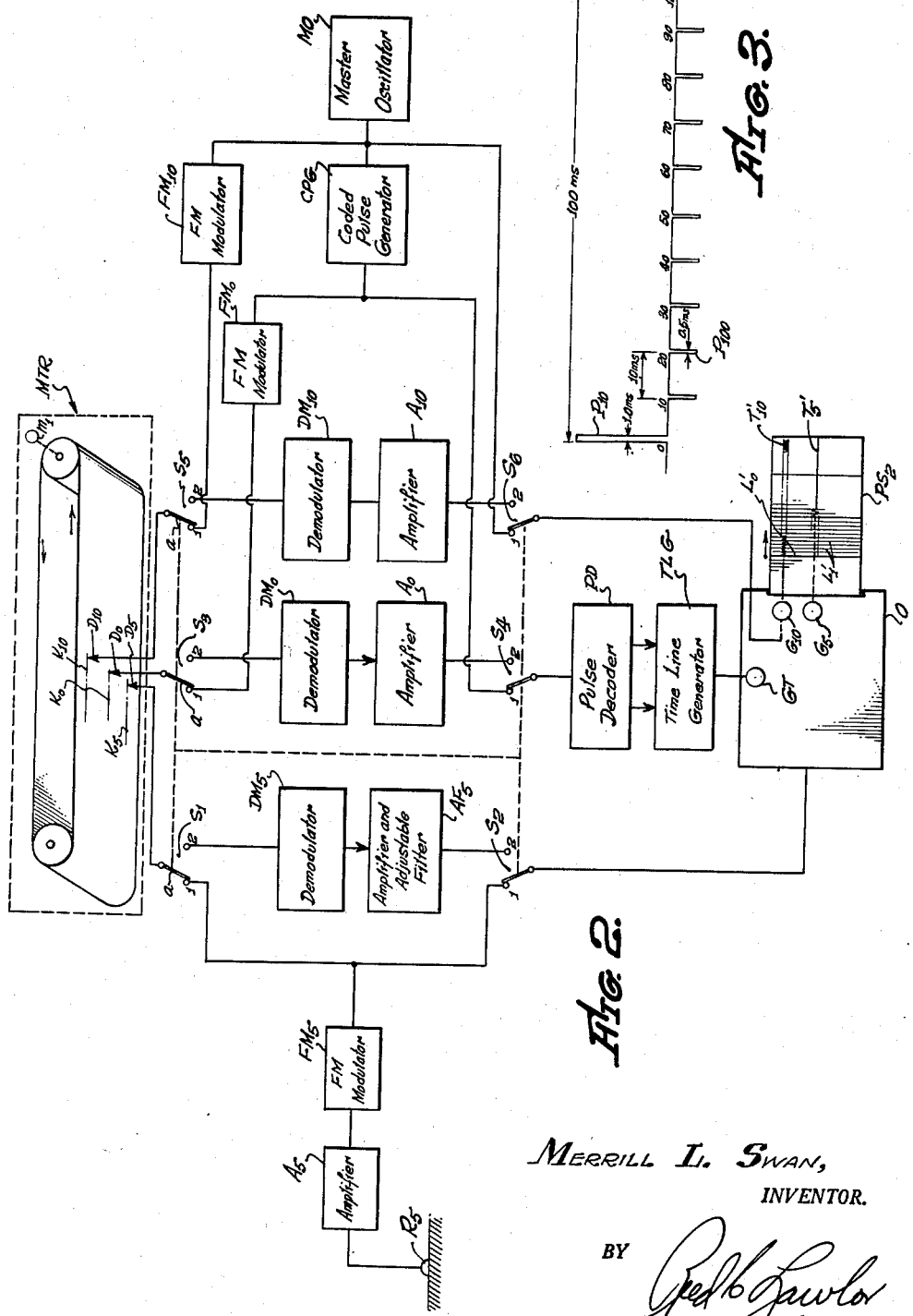

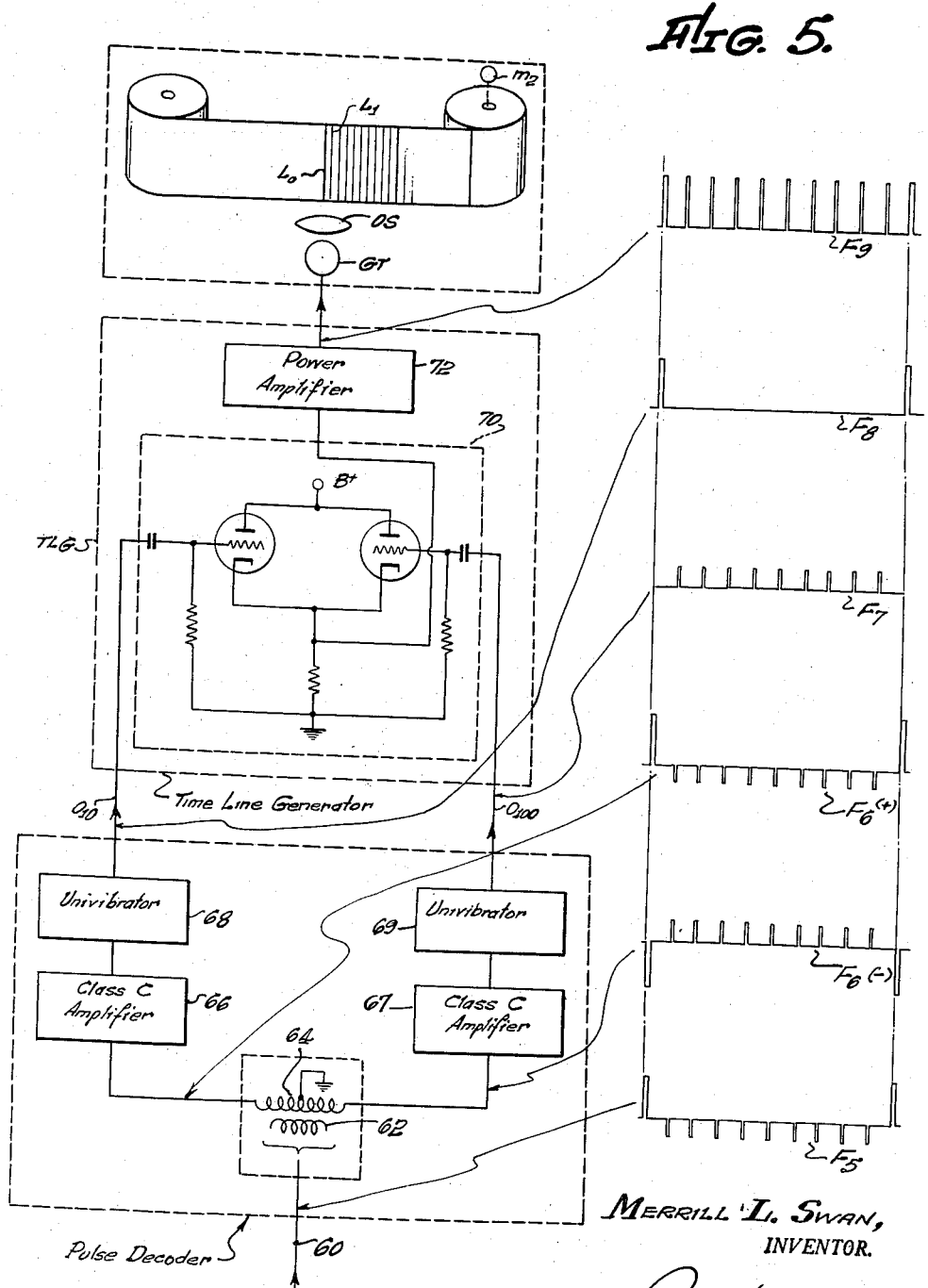

April 12, 1960
M. L. SWAN
2,932,547
SEISMIC WAVE RECORDING SYSTEM
Filed June 28, 1955
5 Sheets-Sheet 5
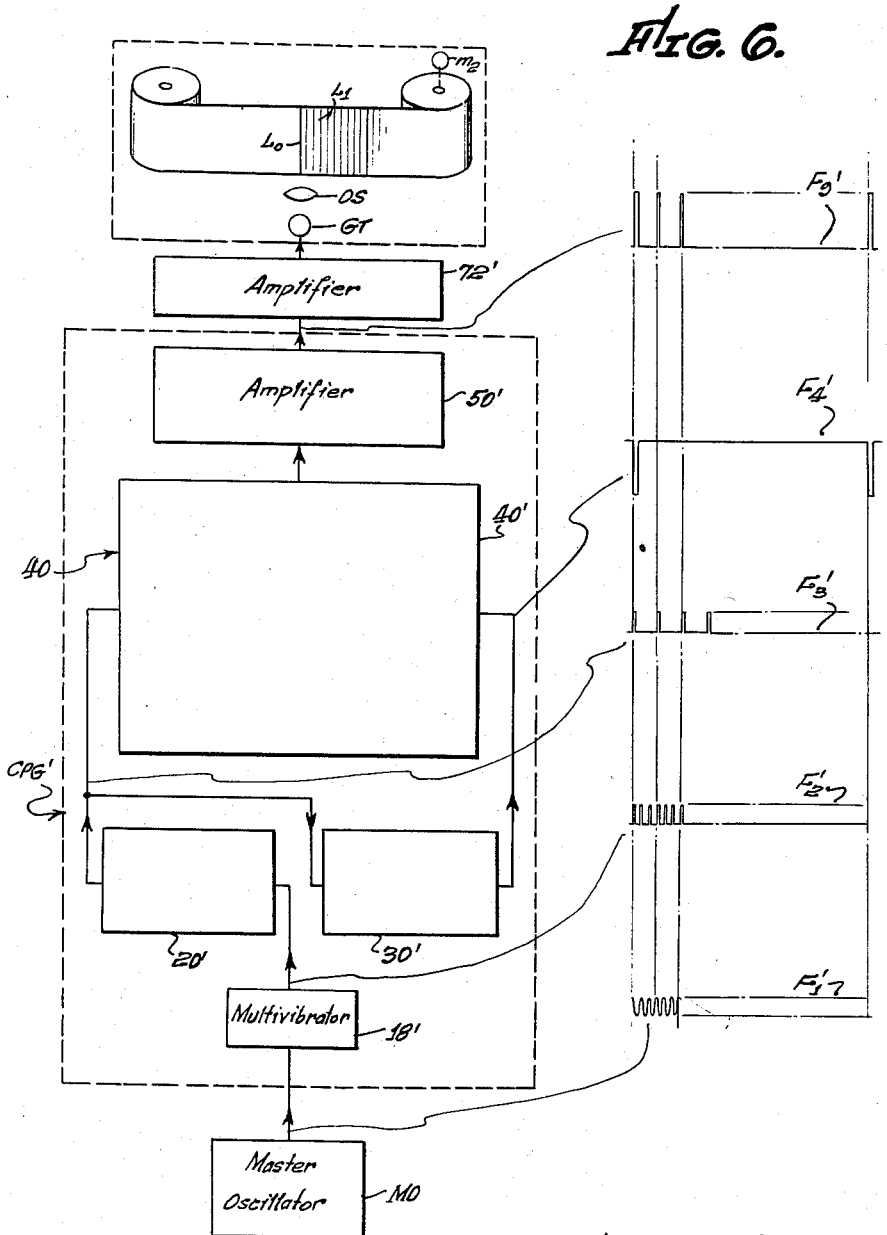
MERRILL L. SWAN,
INVENTOR.
BY 
ATTORNEY.

United States Patent Office 2,932,547
Patented Apr. 12, 1960

2,932,547

SEISMIC WAVE RECORDING SYSTEM

Merrill L. Swan, Pasadena, Calif., assignor to United Geophysical Corporation, a corporation of California Application June 28, 1955, Serial No. 518,591

14 Claims. (Cl. 346—23)

This invention relates to improvements in seismic prospecting systems and to recording devices used therein and more particularly to an improved system for timing the recording of seismic waves, especially where the seismic waves are recorded in reproducible form on magnetic tape and similar recording media.

In reflection seismic prospecting as generally practiced, a charge of explosive is detonated at a shothole, causing seismic waves to travel outwardly therefrom in all directions. Some of these waves are refracted and reflected by underlying formations, thereby being returned to the surface of the earth where they are received by seismometers and converted into corresponding electrical waves. In effect, a train of seismic waves is received at each seismometer and is converted into a train of corresponding electrical waves.

As is well-known, it is often desirable to record seismic waves in limited frequency bands in order to eliminate undesirable seismic waves or extraneous seismic disturbances and to emphasize certain seismic waves which are valuable in determining the structure of the subsurface formations. Sometimes only one shot is fired in a shothole because often the shothole collapses after the first shot. It is therefore highly desirable to produce a record of all seismic waves received from that one shot over a wide frequency band and to subsequently reproduce from that single record seismic waves in limited frequency bands. For this and other reasons, it is desirable to record seismic waves in such a form that they can be reproduced and filtered in any desired way.

In one system for recording seismic waves in reproducible form, the waves are recorded on a continuous or endless magnetic tape, or belt. At the same time that a record is made on the magnetic tape a record may also be made on photographic paper with an ordinary oscillograph. This tape is then played back through a suitable reproducing system and the waves so produced are filtered in various ways in order to simulate the effects of recording originally received waves through amplifiers having different filter characteristics. The filtered played-back waves are recorded on photographic paper in an ordinary oscillograph.

For convenience in distinguishing the seismogram recorded originally simultaneously with the recording of the magnetic tape, such a seismogram is sometimes referred to hereinafter as the original or primary seismogram while a seismogram produced by playing back the record on the magnetic tape is called a secondary seismogram. Also sometimes the original magnetic seismogram is referred to as a primary seismogram.

Both in recording a primary magnetic seismogram and a primary paper seismogram, and also in recording secondary seismograms, it is desirable to provide an accurate timing system by means of which the times of travel and the times of arrival of waves may be accurately measured. As is well known, in seismic prospecting it is desirable to measure the relative times of arrival of waves at the seismometers located at different positions at the surface of the earth. It is also desirable to know the time required for waves to travel from the shothole to reflecting strata and thence to individual seismometers. Furthermore, when the magnetic tape is played back to produce a secondary seismogram, it is important to produce indications of the times of occurrence of waves in such a way that these times can be properly identified on the secondary seismogram.

In order to establish a basis for making measurements of times on a primary seismogram, it is customary to record timing lines or other timing marks on the seismogram simultaneously with the recording of seismic waves. In order to facilitate a proper coordination of a secondary seismogram with a primary seismogram, or even to assure the proper coordination of different secondary seismograms, it has been the practice to record on the magnetic tape a timing track consisting of a series of identical timing marks and to utilize this track to produce timing lines on the secondary seismograms produced by playing back the magnetic tape.

To facilitate the making of measurements when timing lines are employed on a paper seismogram coded timing lines are recorded regularly at intervals of 10 ms. (milliseconds) and every tenth mark or line is recorded in some distinctive fashion so as to indicate clearly the periodic lapse of 100 ms. intervals.

Prior to this invention such coded timing lines have been made by projecting light through slits of a rotating drum and onto the recording paper in the oscillograph. Differentiation between 10 ms. lines and 100 ms. lines has been achieved by making every tenth slit wider than the remaining slits, thus making every tenth timing line darker than the remaining timing lines. However, prior to this invention, so far as the applicant knows, no method was available for producing such differentiation of time marks either in the recording of a primary magnetic seismogram or in the recording of a secondary seismogram. Furthermore, timing lines produced by such a drum are subject to error originating in slow periodic hunting of the motor that drives the drum.

An object of this invention is to provide an improved system for producing coded timing lines on a seismogram free of hunting errors.

Another object of this invention is to provide a system for recording coded timing marks on a magnetic seismogram.

Another object of the invention is to provide an arrangement for recording coded timing lines on a primary photographic seismogram and to simultaneously record coded timing marks on a timing track of a magnetic seismogram.

Another object of the invention is to provide an improved system for coordinating timing lines on primary and secondary seismograms.

Another object of the invention is to provide an improved system for coding time marks recorded on primary seismograms.

Another object of the invention is to provide an improved system for coding two or more concurrent series of timing signals.

Another object of the invention is to provide a system for coding timing signals recorded on a magnetic tape together with a system for decoding those timing signals when the tape is played back so as to provide coded timing signals for recording on a photographic seismogram.

Another object of the invention is to provide an arrangement for differently polarizing two series of timing pulses for recording on a magnetic seismogram, together with an arrangement for coding timing lines produced on a secondary photographic seismogram in accordance with the polarity of the timing marks recorded on the magnetic seismogram.

The invention possesses many other objects and many advantages and features which will become apparent from the following description of specific systems embodying the invention. These specific embodiments of the invention are described in more detail hereinafter in connection with the accompanying drawings, wherein:

Figure 1 is a schematic diagram of a system employing this invention in the simultaneous recording of a primary magnetic seismogram and a primary photographic seismogram;

Fig. 2 is a schematic diagram of a system for playing back a primary magnetic seismogram to produce a secondary photographic seismogram with the same oscillograph that is employed in the recording of the primary magnetic seismogram;

Fig. 3 is a diagram showing the timing of coded pulses employed in this embodiment of the invention;

Fig. 5 is a schematic diagram of a part of the system including the pulse decoder and the timing line generator; and Fig. 6 is a schematic diagram of an alternative embodiment of the invention which includes a coded pulse generator but not a pulse decoder.

General description

Figure 4:
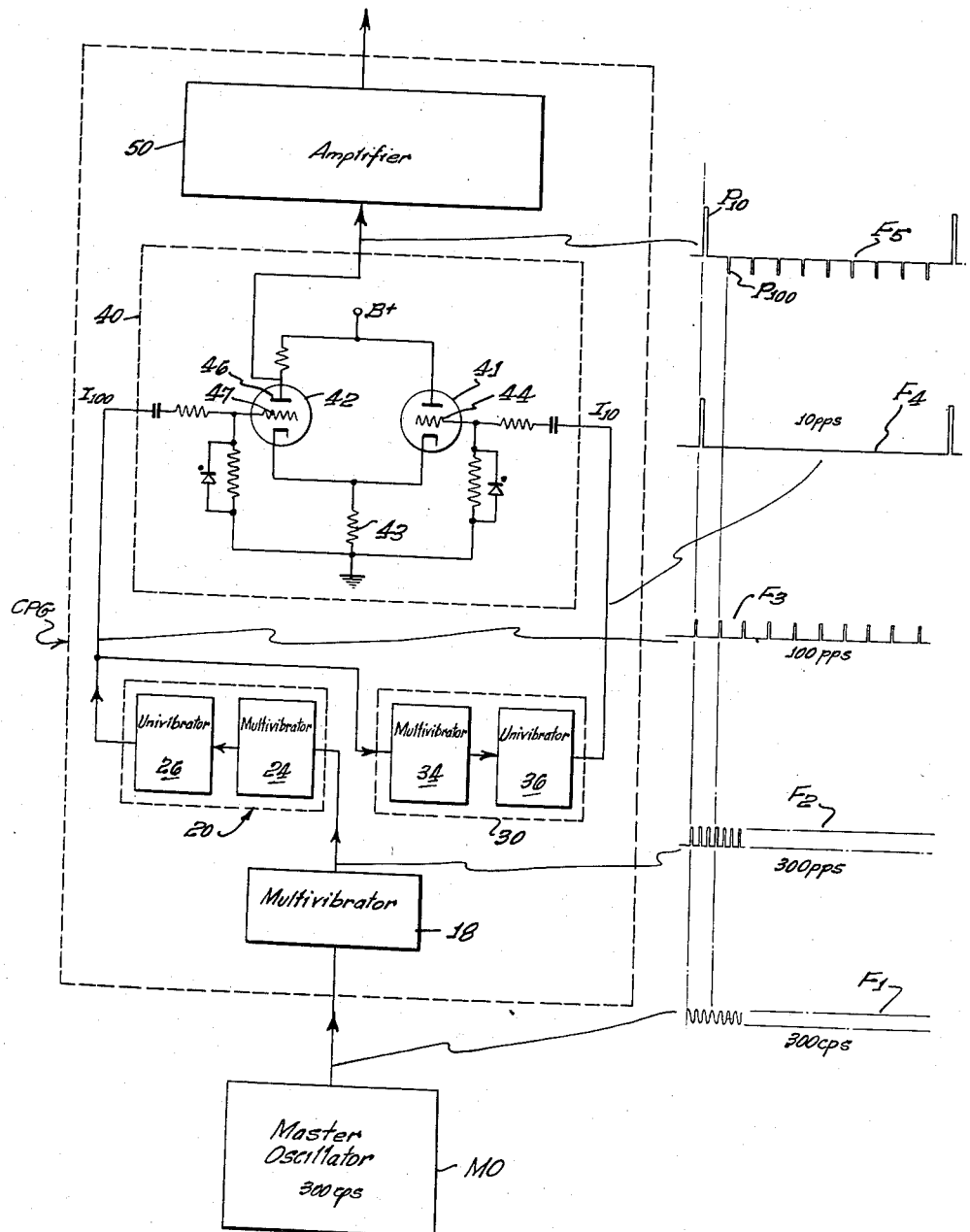
Fig. 4 is a schematic diagram of a part of the system including the coded pulse generator.

According to this invention, coded timing pulses are generated in an electrical code pulse generator. These coded pulses are recorded on the timing track of a magnetic tape seismogram, and the recorded coded pulses are employed in the playback to produce coded timing marks on a secondary seismogram. In this invention, the coded pulses from the same code pulse generator are also employed to produce coded timing lines on a primary photographic seismogram. In the best embodiment of the invention the coded pulses from the same code pulse generator are recorded simultaneously on the primary magnetic seismogram and on the primary photographic seismogram. As a result, in this way, the coded time marks of a secondary seismogram made from the primary magnetic seismogram may be accurately coordinated with the coded time marks of the primary photographic seismogram and the coded time marks on various secondary seismograms may also be accurately coordinated with each other.

In the specific embodiment of the invention described herein, two overlapping series of coded pulses are employed. One series of pulses, hereinafter sometimes referred to as short-interval or high-frequency pulses, occur at a repetition frequency of 100 p.p.s. (pulses per second), that is, these pulses occur at hundredth-second, or 10 ms., intervals. The other series of pulses, hereinafter sometimes referred to as the long-interval, or low-frequency pulses, occur at a repetition frequency of 10 p.p.s., that is, these pulses occur at tenth-second, or 100 ms., intervals. The short-interval, high frequency, pulses are of one polarity and of short duration, while the long-interval, low frequency, pulses are of the opposite polarity and of longer duration. In the best embodiment of the invention, each long-interval, low frequency, pulse is initiated simultaneously with every tenth short-interval, high frequency, pulse and is arranged to mask or swamp that particular short-interval, high frequency, pulse.

In this way, a train or sequence of coded pulses is generated which consists of regularly occurring groups consisting of one pulse $P_{10}$ of one polarity and nine pulses $P_{100}$ of the opposite polarity and successive pulses commence at ten ms. intervals. These pulses are applied to a magnetic tape recorder and to a multiple element oscillograph simultaneously with the application of seismic waves to both recorders. The coded pulses are recorded on the timing track of the magnetic tape recorder at the same time that seismic waves are recorded thereon. Simultaneously the coded pulses are employed to control a time marking generator which places coded time lines on the photographic seismogram of the same seismic waves. Also in the specific embodiments of the invention described herein, when the magnetic seismogram is played back, the coded pulses of its timing track are employed to operate the same time line generator to record coded timing lines on a secondary seismogram made from other tracks of the magnetic tape recorder.

Furthermore, in the specific embodiments of the invention described herein, the time line generator employs a glow tube which is energized to glow for long or short intervals depending upon the duration of pulses applied thereto. This glow tube is arranged to illuminate transverse linear segments of the paper seismogram, thereby producing lines having a light appearance when short pulses are applied thereto and a dark appearance when long pulses are applied thereto.

Recording of primary seismograms

In Fig. 1 there is illustrated a system for recording a primary magnetic tape seismogram and a primary photographic paper seismogram simultaneously, in accordance with this invention, the two primary seismograms being made from waves received at a common spread of seismic wave receivers. In this system a magnetic tape recorder MTR is employed to record a primary magnetic tape seismogram MTS while a multiple element oscillograph O is employed to produce the paper seismogram PS. Coded pulses represented in the coded pulse train CPT produced by a coded pulse generator CPG are recorded on the magnetic tape seismogram. Simultaneously the coded pulses are employed to produce coded timing lines CTL on the paper seismogram. At the same time that the coded pulses are being recorded, seismic waves received at the surface of the earth at a series of receivers $R_1$, $R_2$, $R_3$, $R_4$, . . . and $R_9$ are also recorded on both primary seismograms.

In the particular system herein illustrated, seismic waves are generated at a shot hole SH drilled into the earth to a point beneath the bottom of the weathered layer W. The seismic waves are generated by the detonation of a charge of explosive E located at the bottom of the shot hole, the detonation being initiated by a blaster B. When the seismic waves are generated, some of them travel downwardly into the earth where they are reflected, refracted, and diffracted by various irregularities which they encounter in the formations beneath the surface of the earth. Some of the waves that have been so deflected are returned to the surface of the earth where they are received at a spread of geophones $R_1$ . . . and $R_9$ arranged at regularly spaced intervals along a straight line.

The seismic waves detected by each geophone $R_1$ . . ., or $R_9$ produces an electrical wave in which the amplitude varies as a function of time in accordance with the manner in which the seismic waves by that geophone vary as a function of time, though the shape of the electrical wave may not be the same as the shape of the seismic wave because of frequency discrimination introduced by the geophone. The electrical waves produced at the outputs of the respective geophones $R_1$ . . . and $R_9$ are transmitted through corresponding amplifiers $A_1$ . . . and $A_9$ having a wide pass-band from, say, about 10 c.p.s. to about 200 c.p.s.

To produce the paper seismogram PS of the seismic waves being received, the amplified outputs of the amplifiers $A_1$ . . . and $A_9$ are applied to corresponding galvanometers $G_1$ . . . and $G_9$ of the oscillograph O in conventional manner. As a result a multiple trace seismogram is produced in conventional manner by movement of a strip of unexposed photographic paper PP relative to the galvanometers $G_1$ . . . and $G_9$, each trace $T_1$ . . . $T_9$ representing a train of seismic waves received at the corresponding geophone $R_1$ . . . $R_9$. Simultaneously, the coded time lines CTL are recorded on the photographic paper, thereby producing a primary paper seismogram $PS_1$.

At the same time that the traces $T_1 \ldots T_9$ are being recorded on the primary paper seismogram $PS_1$, tracks consisting of magnetic impressions representing the same waves are recorded on the magnetic tape seismogram MTS. To record such tracks in the system illustrated, the outputs of the respective amplifiers $A_1 \ldots$ and $A_9$ are applied to frequency modulation units $FM_1$, $FM_2 \ldots$ and $FM_9$. Each of the frequency modulators $FM_1 \ldots FM_9$ is of a type in which a carrier wave of constant standard frequency is generated when no signal is applied to its input, but in which the frequency of the carrier wave is modulated when a signal is applied to the input, the deviation of frequency from the constant frequency being proportional to the amplitude of the signal applied to the input. The modulated outputs of the respective frequency modulators $FM_1 \ldots$ and $FM_9$ are applied to corresponding magnetic transducing heads $D_1, D_2 \ldots$ and $D_9$, which are arranged along a line transverse to the direction of movement of a magnetic tape MT. The frequency of the carrier wave is high compared with the frequency of any components of the seismic waves which are to be recorded. Thus where seismic waves in the band between about 10 c.p.s. and about 200 c.p.s. are to be recorded, the carrier-wave frequency may be, say, 2,000 c.p.s. As an unexposed magnetic tape is driven by a motor $m_1$ past the line of magnetic heads $D_1 \ldots$ and $D_9$, each of the heads impresses alternating magnetic fields on the tape at the frequency currently appearing in the output of the corresponding frequency modulator. In this way, tracks $K_1 \ldots$ and $K_9$ consisting of magnetic impressions in the form of frequency modulated signals and representing the seismic waves received by the corresponding geophones, are recorded on the magnetic tape. Simultaneously, the train of coded pulses CPT is applied to a frequency modulation unit $FM_0$ the output of which is applied to a magnetic transducing head DO, thereby recording a timing track $K_0$.

In this way, a primary magnetic tape seismogram consisting of magnetic impressions in the form of a frequency modulated signal representing coded timing pulses and a paper seismogram bearing similarly coded timing lines may be produced simultaneously so that, when secondary seismograms are made later from the magnetic seismogram, coded timing lines on the secondary paper seismogram may be reliably coordinated with the coded timing lines on the primary seismogram.

In the making of the coded time line track on the magnetic tape seismogram MTS, the train of coded pulses is applied to the transducing head DO through the frequency modulator $FM_0$. However, in forming the coded timing lines on the primary paper seismogram $PS_1$, the train of coded pulses is first fed to a pulse decoder PD which serves to segregate the long-interval pulses occurring every 100 ms. from the short-interval pulses occurring every 10 ms. except the tenth. These two sets of pulses are then applied simultaneously to a time line generator TLG which serves to excite a light source in the form of a glow tube GT for a long period at 100 ms. intervals and for short periods at intervening 10 ms. intervals. The glow tube GT is arranged to illuminate the photographic paper being moved relative to the galvanometers in such a way as to form on the unexposed paper PP moved past the galvanometers, wide lines $L_0$ at 100 ms. intervals and narrow lines $L_1$ at intervening intervals of 10 ms. The exposure of the photographic paper is so chosen that the wide lines $L_0$ appear darker than the narrow lines $L_1$. To achieve this result, the amount of illumination striking the paper is set well below the saturation level of the H and D curve of the paper when the short-interval pulses are applied and near the saturation level when the long-interval pulses are applied. For this reason, even though the glow tube GT always emits radiation of the same intensity when excited by a pulse, the exposure of the paper is controlled very largely by the duration of the pulse.

In practice the coded pulse generator is driven by a master oscillator MO which produces a sinusoidal wave of higher frequency than the repetition frequency of the pulses of the coded pulse train. The output of the master oscillator is applied through a frequency modulation unit $FM_{10}$ to a transducing head $D_{10}$ of the magnetic tape recorder and also to a galvanometer $G_{10}$ in the oscillograph O. In this way this sinusoidal wave is recorded as a separate track $K_{10}$ on the magnetic tape seismogram MS and as a separate trace $T_{10}$ on the primary paper seismogram $PS_1$. This track and trace are employed to detect hunting in the movement of either the magnetic tape or the photographic paper as the case may be.

Recording of secondary seismograms

A secondary paper seismogram may be made with the same oscilloscope O that is employed in making the primary paper seismogram, especially when the secondary paper seismogram is made in the field with field equipment that is employed in the making of the primary seismogram. It is often desirable to make a series of differently filtered secondary paper seismograms from the same primary magnetic seismogram. A system for employing the same oscillograph to record primary and secondary seismograms and embodying this invention is illustrated in Fig. 2.

In the system illustrated in Fig. 2, the circuitry applicable to the recording of both primary and secondary paper seismograms for a single typical channel corresponding to only one of the geophones, say geophone $R_5$, is shown. It will be understood, however, that the various parts of the equipment of the system that are specifically associated with geophone $R_5$ are also employed with the other geophones.

To facilitate recording both primary and secondary seismograms, a set of ganged double-throw switches $S_1$, $S_2$, $S_3$, $S_4$, $S_5$, and $S_6$ are employed. Each of these switches has two positions represented in the drawing by the contacts or taps numbered 1 and 2 respectively, corresponding respectively to "record" or "playback" positions. To record primary seismograms on both the magnetic tape recorder MTR and on the oscillograph O, the switches are set in the record position, where their movable arms contact the corresponding No. 1 contact. To record a secondary seismogram, the switches are set in the playback position, where their movable arms contact the corresponding No. 2 contact.

As shown in the drawing, the equipment is set up for recording primary seismograms in the same manner that was previously illustrated in Fig. 1. Thus, when the switches are in the record or No. 1 position, the transducing head $D_5$ is connected to the output of the frequency modulator $FM_5$ through the No. 1 contact of switch $S_1$, and the galvanometer $G_5$ is connected with the output of the modulator $M_5$ through the No. 1 contact of the switch $S_2$. Similarly, when so set, the output of the coded pulse generator is applied to the transducing head $D_0$ through the No. 1 contact of switch $S_3$ and to the pulse decoder PD through the No. 1 contact of switch $S_4$. And similarly, when so set, the output of the master oscillator MO is connected to the transducing head $D_{10}$ through the No. 1 contact of switch $S_5$ and to the galvanometer $G_{10}$ through the No. 1 contact of switch $S_6$. When the equipment is so set, all of the parts are connected in the same manner as was illustrated in Fig. 1. Thus, when seismic waves are received the primary magnetic tape seismogram and a primary paper seismogram may be recorded in the manner hereinbefore described.

When a secondary seismogram is to be produced, the switches $S_1 \ldots S_6$ are set in their playback or No. 2 position. When so set, the transducing heads $D_1$ to $D_{10}$ are operatively connected to the galvanometers $G_1 \ldots G_{10}$ respectively, and at the same time the transducing head $D_0$ is operatively connected to the glow tube GT. Thus, more particularly, when the switches $S_1 \ldots S_6$ are so set, the transducer $D_5$ is connected to a demodulator $DM_5$ through the No. 2 tap of switch $S_1$. The output of the demodulator $DM_5$ is applied to an amplifier and adjustable filter $AF_5$, the output of which is applied to the galvanometer $G_5$ through the No. 2 contact of the switch $S_2$. Likewise, when the switches are so set, the transducing head $D_0$ is connected to a demodulator $DM_0$ through the No. 2 contact of the switch $S_3$, and the output of this demodulator is transmitted through an amplifier $A_0$ to the pulse decoder PD through the No. 2 contact of the switch $S_4$. Also, when the switches are so set, the transducing head $D_{10}$ is connected to a demodulator $DM_{10}$ through the No. 2 contact of switch $S_5$, and the output of the demodulator $DM_{10}$ is transmitted through an amplifier $A_{10}$ through the No. 2 contact through the switch $S_6$ to the galvanometer $G_{10}$. Similar switches, demodulators, amplifiers, and adjustable filters are employed in connection with the other transducing heads $D_1$, $D_2$, $D_3$, $D_4$, $D_6$, $D_7$, $D_8$, and $D_9$ to permit applying signals from the corresponding tracks to the corresponding galvanometers in the oscillograph O.

With both the magnetic tape recorder and the oscillograph O operating, and the switches $S_1 \ldots S_6$ set in playback position, the master oscillator signal that was recorded on channel $K_{10}$ of the magnetic tape is now recreated by the demodulator $DM_{10}$ and recorded as track $T'_{10}$ of the secondary paper seismogram $PS_2$. The two recorders may be operated simultaneously such as by energizing their respective drive motors $m_1$ and $m_2$. Likewise, the signal that was received by the geophone $R_5$ and recorded on track $K_5$ is now recreated by the demodulator $DM_5$ and applied to the amplifier and adjustable filter $AF_5$. In this case, however, unless the adjustable filter is set to pass the same band of frequencies as the amplifier $A_5$, the signal recorded on track $T'_5$ by the galvanometer $G_5$ is not identical with the signal recorded on track $T_5$ of the primary paper seismogram $PS_1$, but is a related signal from which certain components have been filtered. Likewise, filtered traces related to the waves received at the other geophones $R_1$, $R_2$, $R_3$, $R_4$, $R_6$, $R_7$, $R_8$, and $R_9$ are recorded as traces $T'_1$, $T'_2$, $T'_3$, $R'_4$, $T'_5$, $T'_7$, $T'_8$, and $T'_9$, respectively on the secondary paper seismogram $PS_2$.

In practice the adjustable filters in the amplifier filter unit $AF_1$ are often set at a series of values successively and a secondary paper seismogram is made for each setting. In this way a series of secondary seismograms may be made. Waves reflected from different groups of subsurface strata are sometimes more easy to identify on a seismogram made with one filter setting than with another. By extending the series of secondary seismograms, such settings may be ascertained and may be used in the filtering of waves recorded in other parts of the area being explored.

During the recording of the traces $T'_1 \ldots T'_9$, and $T'_{10}$ on the secondary paper seismogram $PS_2$, dark time lines $L'_0$ and light time lines $L'_1$ are also recorded. The recording of the coded time lines on the secondary paper seismogram is produced by the demodulation of signals from the coded pulse track $K_0$ by means of the demodulator $DM_0$. These demodulated pulses are a replica of the coded pulses that originally appeared at the output of the coded pulse generator CPG. These pulses are applied through the amplifier $A_0$ to the pulse decoder and thence to the time line generator TLG so as to operate the glow tube GT to produce a set of time lines $L'_0$ and $L'_1$ which are a replica of the time lines $L_0$ and $L_1$ previously recorded on the primary paper seismogram $PS_1$.

In practice, the filtered seismic waves which are recorded on the secondary seismogram $PS_2$ may not resemble the unfiltered seismic waves recorded on the primary paper seismogram $PS_1$ very closely. One reason for such lack of resemblance lies in the fact that some of the frequency components present on the primary seismogram traces $T_1 \ldots T_9$ have been highly attenuated in producing the secondary seismogram traces $T'_1 \ldots T'_9$. Furthermore, the filters employed at the outputs of the demodulators may introduce phase shifts or time delays which so displace or even scramble the components of the waves that the recognition and identification of identical or corresponding components on the unfiltered and filtered traces is rendered very difficult. While it may be true that this difficulty does not preclude the possibility of interpreting the secondary seismogram in such a way as to obtain valuable data regarding geological formations beneath the surface of the earth, nevertheless, for more complete and accurate studies, it is desirable to be able to measure accurately the occurrence of various events present in the traces of the secondary seismograms, and sometimes to relate these to events occurring on the primary seismograms.

For this reason, the presence of coded time lines $L'_0$ and $L'_1$ on the secondary seismogram which are a replica of those appearing on the primary seismogram aids in the accurate measurement of such time intervals. This is especially important where only a segment of the magnetic tape seismogram is being rerecorded in the form of a secondary paper seismogram. In such a case, the reliability of identification of time lines on the secondary seismogram with those that appear on the primary seismogram is increased even though the interpreter relies in part upon the appearance of related, similarly shaped waves on the two seismograms. Thus, the coordination of the time lines may be made partly by the identification or the recognition of strong or high-amplitude waves on both records. However, by creating similarly coded time lines on both records, errors that might otherwise arise because of the action of filters is avoided. This is particularly true because of the fact that the interval between successive low-frequency time lines $L_0$ and $L'_0$, is longer than the period of seismic waves which may be relied upon partially to correlate time lines on the two paper seismograms. Furthermore, as explained more fully hereinafter, the dark long-interval or low-frequency time lines $L_0$ are always recorded at the same points in time on the secondary paper seismogram $PS_2$ in relationship to the occurrence of seismic events thereon, even though for some reason there is a failure either to record or to reproduce coded pulses for short intervals of time on the magnetic tape seismogram.

After all the needed series of secondary seismograms have been made, the magnetic tape may be removed and stored and replaced by another magnetic tape in preparation for making another primary magnetic seismogram. However, if there is no need to preserve the primary magnetic seismogram, the records made on it may be erased by any suitable means and a new primary seismogram recorded on the same magnetic tape.

The coded pulse generator

A coded generator CPG embodying features of this invention is illustrated in Fig. 3. This coded pulse generator is designed to produce at its output two overlapping or concurrent, periodic series of differently coded pulses. One series of pulses $P_{10}$ is coded in one way, being relatively large positive long-interval low-frequency pulses of relatively long duration. The second series of pulses $P_{100}$ is coded in another way, being relatively small short-interval high-frequency pulses of relatively short duration. In the specific embodiment of the invention illustrated here, the pulses $P_{10}$ are actually distinguished from the other pulses $P_{100}$ in three different ways, namely, polarity, magnitude and duration. Of these three factors, in the specific embodiments of the invention disclosed herein, the difference in polarity is the most important in connection with the recording and reproducing of the timing track $K_0$ of the magnetic seismogram, while the difference in duration is the most important in connection with the recording of the photographic seismogram. The coding of pulses by their polarity is of great value because the difference of polarity greatly simplifies the segregation of the two series of pulses in the pulse decoder PD. The difference in amplitude is not employed for distinguishing between the two series of pulses in the decoder in the specific decoder employed herein, but arises because of the nature of the specific code pulse generator used.

The coded pulse generator CPG has a univibrator 18 at its input to which sinusoidal voltage waves having a frequency of 300 c.p.s. are supplied from the master oscillator MO. The univibrator is of a type which responds to positive-going signals applied to its input to produce a square wave of short duration at its output. Thus, each cycle of the 300 c.p.s. signal as represented in graph $F_1$ applied by the master oscillator MO causes a corresponding square wave to be produced at the output of the univibrator 18. The recovery time of the univibrator is small compared to the period of the 300 c.p.s. signal applied from the master oscillator, being about 1.0 ms. or less. Thus, the signal appearing at the output of the univibrator 18 is in the form of a 300 p.p.s. signal as represented in graph $F_2$. The output of the univibrator 18 is applied to a scale-of-three frequency divider unit 20 which is adapted to produce at its output a square wave signal at 100 p.p.s. as indicated by graph $F_3$.

The divider unit 20 comprises a slave oscillator in the form of a free-running multivibrator 24 which is connected directly to the output of the univibrator 18 and a univibrator 26 which is connected to the output of the multivibrator 24. The multivibrator 24 is designed to vibrate periodically at a frequency of slightly less than one-third of 300 c.p.s. Specifically, the free running frequency of the multivibrator 24 may be about 95 p.p.s. When the multivibrator 24 is driven by the univibrator 18, however, the univibrator synchronizes the multivibrator every third time that a pulse is applied thereto from the univibrator. Thus, the multivibrator is driven at 100 p.p.s. The multivibrator 24 is designed to have a recovery time of about 1.0 ms. so that pulses having a duration of about 1.0 ms. appear periodically at the output of the multivibrator at 100 p.p.s. These pulses are applied to a univibrator 26 which acts as a pulse shaper. This univibrator has a recovery time of approximately 0.5 ms., thereby producing at its output pulses having a duration of about 0.5 ms. at 100 p.p.s., as indicated in graph $F_3$.

The output of the scale-of-three divider 20 is applied to the input of a scale-of-ten divider unit 30. This divider unit likewise comprises a sub-slave oscillator in the form of a free-running multivibrator 34 and a univibrator 36. The multivibrator 34 is adapted to oscillate at a frequency slightly less than one-tenth of the frequency of the signals appearing at the output of the first divider unit 20. Specifically, the multivibrator 34 is designed to oscillate at a frequency of about 9.5 p.p.s. This multivibrator 34 is designed to be synchronized by the 100 p.p.s. pulses applied to its input so as to produce 10 p.p.s. pulses at its output. If desired, the multivibrator 34 may actually be in the form of two multivibrator stages connected in cascade, the first stage being designed to run freely at a frequency of about 19 p.p.s. and to multivibrate at a frequency of 20 p.p.s. when driven by the output of the first divider unit 20, and a second stage being designed to run freely at a frequency of 9.5 p.p.s. and to multivibrate at a frequency of 10 p.p.s. when driven at 20 p.p.s. In any event, the output of the multivibrator 34 is applied to a univibrator 36, which is designed to produce a square wave pulse at its output each time a positive-going pulse is applied to its input.

The univibrator 36 has a recovery time longer than that of the univibrator 26, being about 1.0 ms. As a result, the divider unit 30 produces at its output a series of pulses $P_{10}$ each of which has a duration of 1.0 ms. at intervals of 100 ms. as shown in graph $F_4$, while the divider unit 20 produces at its output a series of pulses $P_{100}$ each of which has a duration of 0.5 ms. at intervals of 10 ms. As shown in Fig. 3, the two divider units are so designed that the two sets of pulses appearing at the output of the two divider networks 20 and 30 have opposite polarity. Furthermore, the univibrators 26 and 36 are so designed that the low-frequency pulses $P_{10}$ produced at the output of the second divider network 30 are of greater amplitude than the high-frequency pulses $P_{100}$ produced at the output of the first divider network 20. The circuits are also so designed that a low-frequency pulse $P_{10}$ commences simultaneously with every tenth high-frequency pulse $P_{100}$. Multivibrators and univibrators having the properties specified above are well known and readily provided by those skilled in the art and are therefore not described in detail herein.

The two series of oppositely polarized pulses are applied to separate inputs $I_{10}$ and $I_{100}$ of a mixer 40. The mixer is so designed that the high-frequency pulses $P_{100}$ are transmitted therethrough with a reversal of polarity, while the low-frequency pulses $P_{100}$ are transmitted therethrough without a reversal of polarity. More particularly, the mixer 40 comprises a pair of triodes 41 and 42 which have a common cathode resistor 43. Large positive pulses applied from the divider unit 30 through the input $I_{10}$ to the grid 44 of the triode 41 appear as positive pulses across the cathode resistor 43. Such positive pulses applied across the cathode resistor 43 drive the triode 42 beyond cut-off, thereby producing corresponding positive pulses $P_{10}$ at its anode 46. Negative pulses applied from the divider unit 20 through the input $I_{100}$ to the grid 47 of the triode 42 produce corresponding positive pulses at the anode 46, when no pulses are applied to the other input $I_{10}$. However, when pulses are applied to both inputs $I_{10}$ and $I_{100}$, the long-interval pulses $P_{10}$ control the operation of the triode 42 because the amplitude of the long-interval pulses is greater than that of the short-interval pulses, and because the circuit is so designed that the triode 42 is driven beyond cut-off by a voltage equal to or greater than the difference in amplitude of the pulses supplied to the two inputs $I_{10}$ and $I_{100}$.

Thus, the mixer 40 produces at its output a train of coded pulses consisting of a pair of overlapping or concurrent series of pulses $P_{10}$ and $P_{100}$ as shown in graph $F_5$. The low-frequency pulses $P_{10}$ are square wave pulses which completely mask any short-interval pulses that might otherwise occur simultaneously. Nine short high-frequency pulses $P_{100}$ appear between successive long low-frequency pulses $P_{10}$. Furthermore, the ten pulses generated in each interval of 100 ms. commence at times that are spaced apart regularly by equal intervals of 10 ms.

The coded series of pulses so produced is applied through an amplifier 50 to be used either in making time marks on a primary magnetic tape seismogram MS or in making time lines on a primary paper seismogram $PS_1$, or for both purposes simultaneously.

*Pulse decoder and time line generator*

In accordance with this invention, a coded series of pulses of the type illustrated in Fig. 3 is generated by the coded pulse generator CPG. A similar coded series of pulses may be obtained by playing back the timing track $K_0$ of a primary magnetic seismogram and passing the signal obtained in the playback operation through the demodulator DM. A coded series of pulses obtained from either source is employed to produce coded timing lines on a paper seismogram produced with the multiple element oscillograph O.

The series of coded pulses are segregated in the pulse decoder PD so as to produce at its outputs $O_{10}$ and $O_{100}$ two series of pulses of the same polarity. The pulses $P_{10}$ of one series are long and appear at long intervals of 100 ms., and the pulses of the other series are short and appear regularly at intervening times at intervals of 10 ms. The long-interval pulses are applied to the time line generator TLG to produce dark time lines, while the short-interval pulses are applied to the time line generator to produce light time lines in either the primary photographic seismogram $PS_1$ or the secondary photographic seismogram $PS_2$ as the case may be.

In the specific embodiment of the invention illustrated herein, the positive and negative pulses of the coded sequence of pulses are segregated in the pulse decoder PD according to the polarity of the pulses regardless of their length or amplitude. More particularly, in the decoder PD illustrated in Fig. 5, the train of coded pulses is applied to the input 60 of the pulse decoder and is impressed upon a transformer 62 having a secondary winding 64 which is grounded at its center. As a result, the sequence of coded pulses appears on both halves of the secondary winding but with opposite polarity, as indicated by graphs $F_6(-)$ and $F_6(+)$.

The signals appearing across the opposite halves of the secondary winding are applied to a pair of rectifiers in the form of similar class C amplifiers 66 and 67. The class C amplifier 66 is designed to transmit in amplified form only positive pulses but not negative pulses, while the class C amplifier 67 is designed to transmit in amplified form negative pulses, but not positive pulses. Thus, positive pulses occur at 10 p.p.s. in the output of the class C amplifier 66. These pulses are then applied to a univibrator 68 which has a recovery time of about 1.0 ms. As a result, pulses appear at the output $O_{10}$ of the pulse decoder which have durations of about 1.0 ms. and which recur regularly at 10 p.p.s. In a similar way, negative pulses occur at 100 p.p.s. in the output of the class C amplifier 67. These pulses are then applied to a univibrator 69 which has a recovery time of about 0.5 ms. As a result, pulses appear at the output $O_{100}$ of the pulse decoder which have durations of about 0.5 ms. and which recur regularly at 100 p.p.s. But every tenth high frequency pulse that would otherwise recur in a regular series is absent while a pulse appears at the output $O_{10}$.

The long-interval pulses and the short-interval pulses thus appearing at the outputs $O_{10}$ and $O_{100}$ are impressed upon a push-push cathode-loaded amplifier 70 at the input of the time line generator TLG. The amplifier 70 produces at its output an integrated series of positive pulses $P_{10}$ and $P_{100}$ which commence at regular intervals of 10 ms., the pulses $P_{10}$ having a duration twice that of the pulses $P_{100}$. These pulses are applied to a power amplifier 72 which operates to cause the glow tube to light up each time a positive pulse is applied to the input of the amplifier and for the duration of the pulse. Light from the glow tube is focused by means of an optical system OS (represented here symbolically by a lens) as a line image in the plane of the photographic paper upon which the seismogram is being recorded. As the photographic paper moves past the line image thus formed in the plane of the paper, dark and light time lines $L_0$ and $L_1$ are formed on the paper according to the duration of the pulses being impressed upon the glow tube GT.

*Direct recording of paper seismograms*

This invention may also be employed where no magnetic recorder is employed. In such a case, the circuits may be simplified somewhat. A system for recording a paper seismogram directly without introducing circuits particularly useful as described above for recording a magnetic seismogram is illustrated in Fig. 6.

In this system, a coded pulse generator CPG' similar to that illustrated in Fig. 4 is employed. Similar parts and graphs are indicated by the same symbols followed by primes. Except where otherwise indicated, corresponding parts in the system of Fig. 6 and systems previously described herein, are identical. In the system of Fig. 6, the output consists of a series of coded pulses of the same polarity as represented by graph $F'_9$, and these pulses are fed directly to the glow tube GT instead of being applied first to a frequency modulator $FM_0$ and then to a demodulator $DM_0$ and then to a pulse decoder PD and a time line generator TLG, as is the case where a primary paper seismogram is being made in accordance with the system illustrated in Fig. 1.

The coded pulse generator CPG' illustrated in Fig. 6 is substantially identical with the code pulse generator CPG illustrated in Fig. 4, except that the two divider units 20' and 30' are designed to produce pulses $P_{100}$ and $P_{10}$ respectively which have the opposite polarity, as represented by the graphs $F'_3$ and $F'_4$ of Fig. 6. With such an arrangement, when these two sets of pulses are applied to the mixer circuit 40', they produce the desired series of coded positive pulses identical with those otherwise appearing in the time line generator of Fig. 5. Accordingly, when these pulses are amplified by the power amplifier 72' they operate the glow tube to produce dark and light coded time lines $L_0$ and $L_1$ as in the system of Fig. 1.

It will be understood, of course, that the system of Fig. 6 may also be readily adapted for use in the system of Fig. 1 if desired.

*Direct recording of polarized pulses on magnetic seismogram*

In the systems specifically described above, oppositely polarized pulses are recorded in frequency modulated form on the time track $K_0$ of the magnetic tape. These systems require the use of both a frequency modulating unit $FM_0$ and a demodulator DM. If desired, such units may be eliminated by applying the train of positive and negative pulses directly to the transducing head $D_0$. A system for producing such a result would be identical with that illustrated in Figs. 1 and 2, except that the frequency modulation unit $FM_0$ and the demodulator DM would be omitted.

In either event, regardless of whether a modulated wave is recorded or whether the pulses are recorded directly, the time track produced is characterized by time marks that are coded in accordance with the polarity of the pulses applied thereto.

*Conclusion*

From the foregoing explanation, it is seen that a new system for coding time lines or other time marks of a seismogram or other oscillogram has been provided. This system increases the reliability of producing coded time marks on a photographic seismogram or other photographic oscillogram by virtue of the fact that hunting errors that might otherwise affect the regularity of recording the time lines are avoided.

Furthermore, by employing this invention, an exact correlation, or synchronization, may be readily established between a primary photographic seismogram and a secondary photographic seismogram derived from the same seismic waves. In this connection, it is to be borne in mind that difficulties are met when an attempt is made to record uncoded time marks on a magnetic tape and then to produce the coding in the reproduction of the time track of the magnetic tape to produce coded time lines in a photographic seismogram. One reason for this lies in the fact that if the time marks on the magnetic tape are not coded, then when arbitrarily selected parts of the magnetic tape are played back, the coding of the time lines on the photographic seismogram may be initiated randomly at various times depending upon the instant of initiation of playback operation.

Another advantage of employing coded time marks in the making of the magnetic seismogram lies in the fact that in the playback of a magnetic tape record, the adverse effects that "drop-outs" and "noise" would otherwise have on the synchronization of records, are avoided. Such drop-outs occur, for example, where nodules or splices appear in the tape. Such noise may occur where minor irregularities exist in the tape. Drop-outs interfere with the transducing of time marks, thereby producing in effect a time lapse. Noise, on the other hand, sometimes causes large spurious pulses to appear which might actuate a coding device in the same way that the time marks actuate it. Thus, the nodules, in effect, cause a coding system to count too few timing marks, thus increasing the time interval between every tenth counted pulse. On the other hand, such spurious noise signals insert or add pulses, causing a coder to count too many time marks in a given time interval and thus decrease the time interval between every tenth counted pulse. Both of these defects are overcome by precoding the time marks in accordance with this invention before they are recorded on the magnetic tape.

While the time marks could be coded in other ways than that described herein, where two types of coding only are desired, it is very useful to employ opposite polarity as a means for coding the time pulses. In this way, a very reliable, positive, easily recognized and detected, action is produced in the playback operation, thus making it easy to decode the played back timing pulses to produce the desired coded pulses or coded time lines. Also, while the oppositely polarized pulses may be recorded directly on the magnetic tape to produce coded time marks thereon, it is advantageous to record them in the form of frequency modulated waves, since waves may be so recorded and reproduced with a high signal-to-noise ratio.

In the specific pulse code generator described herein, two slave oscillators in the form of frequency dividers including multivibrators are synchronized by driving one of the slave oscillators by a master oscillator and driving the remaining slave oscillator by the slave oscillator driven by the master oscillator. It will be understood though that some of the benefits of the invention may be achieved by employing other methods of synchronizing the oscillators and even by employing two oscillators without synchronization.

It is therefore to be understood that even though only specific forms of the invention have been described herein, the invention may be embodied in many other forms within the scope of the appended claims.

The invention claimed is:

1. A seismic prospecting system comprising:

a recording system for making a multiple line seismogram of seismic waves received at a plurality of spaced points of the earth;

a time marking device for making a series of time marks on said seismogram to aid in determining the times of occurrence of events on the lines of said seismogram;

a coded pulse generator for producing two overlapping series of periodic pulses, said generator including means producing a first series of pulses of a first polarity and first repetition rate, said generator also including means producing a second series of pulses of a polarity opposite to said first polarity and of a second repetition rate that is a fixed multiple of said first repetition rate;

and means controlled by said coded pulse generator for operating said marking device to code the marks recorded on said seismogram in accordance with the polarity of said pulses.

2. A seismic prospecting system comprising:

a recording system including an oscillograph for making a multiple trace photographic seismogram of seismic waves received at a plurality of spaced points of the earth;

means including a light source for producing time lines on said photographic seismogram during the recording of seismic waves thereon;

a coded pulse generator including means operative to provide an output train of pulses comprising two overlapping series of periodic pulses, the pulses of the two series occurring at different frequencies and being oppositely polarized, the pulses of one of said series occurring at a frequency which is a fixed multiple of the frequency of the pulses of said other series;

and means controlled by said coded pulse generator for energizing said light source at regular intervals for short times and for concurrently energizing said light source at different regular intervals for long times.

3. A seismic prospecting system comprising:

a recording system including a magnetic recorder for making a multiple track magnetic seismogram of seismic waves received at a plurality of spaced points of the earth;

a time marking device for making a series of magnetic impressions on said magnetic seismogram to aid in determining the times of occurrence of events on the tracks of said seismogram;

a coded pulse generator for producing an output pulse train comprising two overlapping series of periodic pulses, the pulses of the two series occurring at different frequencies related to one another by a fixed multiple, and being oppositely polarized;

and means controlled by said coded pulse generator for operating said marking device to code the marks recorded on said seismogram in accordance with the polarity of said pulses.

4. A seismic prospecting system comprising:

a recording system including a magnetic recorder for making a multiple track magnetic seismogram of seismic waves received at a plurality of spaced points of the earth;

a time marking device for making a series of magnetic impressions on said magnetic seismogram to aid in determining the times of occurrence of events on the tracks of said seismogram;

first and second oscillators each adapted to generate periodically occurring pulses at different frequencies related to one another by a fixed multiple;

means for combining the outputs of said oscillators to produce two overlapping series of oppositely polarized pulses;

and means controlled by said oscillators for operating said marking device to code the marks recorded on said seismogram in accordance with the polarity of said pulses.

5. A seismic prospecting system comprising:

a first recording system including an oscillograph for making a multiple trace photgraphic seismogram of seismic waves received at a plurality of spaced points of the earth;

a time marking device for making a series of time marks on said photographic seismogram to aid in determining the times of occurrence of events on the respective traces;

a second recording system operable simultaneously with said first recording system and including a magnetic recorder for making a multiple track magnetic seismogram of said seismic waves simultaneous with the making of said photographic seismogram of said seismic waves;

a time marking device for making a separably distinct series of magnetic impressions on said magnetic seismogram to aid in determining the times of occurrence of events on said multiple seismic wave tracks of said seismogram;

a coded pulse generator for producing two overlapping series of periodic electric pulses, said generator including means operative to produce a first coded series of periodic pulses of one polarity and means operative to produce a second coded series of periodic pulses of opposite polarity, the repetition rate of one said series of pulses being a fixed multiple of the repetition rate of the other of said series of pulses;

means controlled by said coded pulse generator for operating said marking device to code the marks recorded on said photographic seismogram in accordance with the coding of said series of pulses;

means controlled by said coded pulse generator for operating said marking device to code the separably distinct impressions recorded on said magnetic seismogram in accordance with the coding of said series of pulses;

means for transducing said multiple seismic wave tracks of said magnetic seismogram for making a second multiple trace photographic seismogram of said waves;

and means controlled by the magnetic record of said series of separably distinct coded magnetic impressions on said magnetic seismogram for recording similarly coded time marks on said second photographic seismogram whereby the timing of related events on said two photographic seismograms may be coordinated.

6. A seismic prospecting system comprising:

a first recording system including an oscillograph for making a multiple trace photographic seismogram of seismic waves received at a plurality of spaced points of the earth;

means including a light source for producing time lines of said photographic seismogram during the recording of seismic waves thereon;

a second recording system including a magnetic recorder for making a multiple track magnetic seismogram of said seismic waves;

a time marking device for making a series of magnetic impressions on said magnetic seismogram to aid in determining the times of occurrence of events on the tracks of said seismogram;

a coded pulse generator for producing two overlapping series of periodic pulses, said generator including means producing pulses of a first series occurring at one frequency and for one interval and of one polarity and means producing pulses of a second series occurring at another frequency that is a substantially fixed multiple of said one frequency and for a second interval and of the opposite polarity;

means controlled by said coded pulse generator for energizing said light source at regular intervals for short times and for concurrently energizing said light source at different regular intervals for long times;

and means controlled by said coded pulse generator for operating said marking device to code the marks recorded on said magnetic seismogram in accordance with the polarity of said pulses.

7. A seismic prospecting system comprising:

a first recording system including an oscillograph for making a multiple trace photographic seismogram of seismic waves received at a plurality of spaced points of the earth;

means including a light source for producing time lines on said photographic seismogram during the recording of seismic waves thereon;

a second recording system including a magnetic recorder for making a multiple track magnetic seismogram of said seismic waves;

a time marking device for making a series of magnetic impressions on said magnetic seismogram to aid in determining the times of occurrence of events on the tracks of said seismogram;

a coded pulse generator for producing two overlapping series of periodic pulses, said generator including means producing the pulses of said first series at one frequency and for one interval and of one polarity and means producing the pulses of the second series at another frequency that is a fixed multiple of said one frequency and for a second interval and of the opposite polarity;

means controlled by said coded pulse generator for energizing said light source at regular intervals for short times and for concurrently energizing said light source at different regular intervals for long times;

means controlled by said coded pulse generator for operating said marking device to code the marks recorded on said magnetic seismogram in accordance with the polarity of said pulses;

means for transducing said tracks of said magnetic seismogram for making a second multiple trace photographic seismogram of said waves;

and means controlled by the magnetic record of said series of coded pulses for recording similarly coded time marks on said second photographic seismogram whereby the timing of related events on said two photographic seismograms may be coordinated.

8. A seismic prospecting system comprising:

a first recording system including an oscillograph for making a multiple trace photographic seismogram of seismic waves received at a plurality of spaced points of the earth;

means including a light source for producing time lines on said photographic seismogram during the recording of seismic waves thereon;

a second recording system including a magnetic recorder for making a multiple track magnetic seismogram of said seismic waves;

a time marking device for making a series of magnetic impressions on said magnetic seismogram to aid in determining the times of occurrence of events on the tracks of said seismogram;

a coded pulse generator for producing two overlapping series of periodic pulses, said generator including means producing the pulses of said first series at one frequency and for one interval and of one polarity and means producing the pulses of the second series at another frequency that is a substantially fixed multiple of said one frequency and for a second interval and of the opposite polarity;

means controlled by said coded pulse generator for energizing said light source at regular intervals for short times and for concurrently energizing said light source at different regular intervals for long times;

means controlled by said coded pulse generator for operating said marking device to code the marks recorded on said magnetic seismogram in accordance with the polarity of said pulses;

means for transducing said tracks of said magnetic seismogram for making a second multiple trace photographic seismogram of said waves with said oscillograph;

and means controlled by the record of said series of coded pulses on said magnetic seismogram for energizing said light source for long durations at one of said frequencies and for short durations at the other of said frequencies.

9. A seismic prospecting system comprising:

a first recording system including an oscillograph for making a multiple trace photographic seismogram of seismic waves received at a plurality of spaced points of the earth;

means including a light source for producing time lines on said photographic seismogram during the recording of seismic waves thereon;

a second recording system including a magnetic recorder for making a multiple track magnetic seismogram of said seismic waves;

a time marking device for making a series of magnetic impressions on said magnetic seismogram to aid in determining the times of occurrence of events on the tracks of said seismogram;

a coded pulse generator including separate pulsing means operative respectively to produce two overlapping series of periodic pulses, the pulses of said first series occurring at one frequency and for one interval and being of one polarity, the pulses of the second series occurring at another frequency that is a substantially fixed multiple of said one frequency and for a second interval and being of the opposite polarity;

means controlled by said coded pulse generator for energizing said light source at regular intervals for short times and for concurrently energizing said light source at different regular intervals for long times;

means controlled by said coded pulse generator for operating said marking device to code the marks recorded on said magnetic seismogram in accordance with the polarity of said pulses;

means for transducing said tracks of said magnetic seismogram for making a second multiple trace photographic seismogram of said waves with said oscillograph;

means controlled by the magnetic record of pulses of one polarity for energizing said light source for long intervals;

and means controlled by the record of said pulses of the other polarity on said magnetic seismogram for energizing said light source for short intervals, whereby light and dark time lines are formed on said photographic seismogram at different frequencies.

10. In a recording system, the combination of:

a first magnetic head, means for supplying said first head with signals that vary as a function of time;

means for moving a magnetic recording medium relative to said magnetic head to impress a magnetic record of said signals on said magnetic recording medium to form a signal track representing such signals;

first and second oscillators each adapted to generate a series of periodically occurring pulses having opposite polarities respectively, at least some of the pulses of one polarity generated by one oscillator occurring at a different time from some of the pulses of opposite polarity generated by the other oscillator;

means for synchronizing the operation of said two oscillators whereby the opposing polarity pulses of the two series are generated in fixed time relationship with respect to each other;

means for combining the outputs of said first and second oscillators to produce a unitary train of oppositely polarized electric pulses;

and a second magnetic recording head controlled by said train of oppositely polarized electric pulses for recording said pulses on a time track, separate and distinct from said signal track on said magnetic recording medium as it is moved relative to said first magnetic recording head.

11. In a recording and reproducing system, the combination of:

a first magnetic head, a signal source coupled to said first head for supplying said first head with signals that vary as a function of time;

means for moving a magnetic recording medium relative to said magnetic head to impress a magnetic record of said signals on said magnetic recording medium to form a signal track representing such signals;

first and second oscillators each adapted to generate periodically occurring pulses at different frequencies respectively related to one another by a fixed multiple;

means for combining the outputs of said oscillators to produce two overlapping series of oppositely polarized pulses;

a second magnetic head controlled by said pulses for recording said oppositely polarized pulses as a time track on said recording medium as it is moved relative to said first magnetic head;

a galvanometer adapted to be supplied with signals that vary as a function of time;

means for moving a strip of photographic paper or the like relative to said galvanometer to produce an oscillographic trace representing said signals on said strip;

means controlled by the signals recorded on said signal track for applying similar signals to said galvanometer;

and means controlled by oppositely polarized pulses on said time track for recording coded time marks on said photographic strip, said last-named means including polarity responsive means for converting said oppositely polarized pulses on said time track into control signals of differing time widths for controlling said recording of said coded time marks on said photographic strip.

12. In a recording and reproducing system, the combination of:

a first magnetic head, a signal source coupled to said first head for supplying said first head with signals that vary as a function of time;

means for moving a magnetic recording medium relative to said magnetic head to impress a magnetic record of said signals on said magnetic recording medium to form a signal track representing such signals;

first and second oscillators each adapted to generate periodically occurring pulses at different frequencies respectively related to one another by a fixed multiple;

means for combining the outputs of said oscillators to produce two overlapping series of oppositely polarized pulses;

a second magnetic head controlled by said pulses for recording said oppositely polarized pulses as a time track on said recording medium as it is moved relative to said first magnetic head;

a galvanometer adapted to be supplied with signals that vary as a function of time;

means for moving a strip of photographic paper or the like relative to said galvanometer to produce an oscillographic trace representing said signals on said strip;

means controlled by the signals recorded on said signal track for applying similar signals to said galvanometer;

a light source;

means to project radiation from said light source onto said photographic strip to produce a line image of said light transverse to the direction of movement of said paper relative to said galvanometer;

and means controlled by oppositely coded pulses on said time track for energizing said light source for long and short intervals according to the polarity of the pulses whereby light and dark coded time lines are recorded on said photographic strip.

13. In a pulse operated system, the combination of:

a first source of pulses of a first kind that recur regularly at one frequency;

a second source of pulses of a second kind that recur regularly at a second frequency which is a fixed multiple of said one frequency, the durations of the pulses of both sources being short compared with the intervals between them; said first and second sources of pulses being substantially in synchronism with one another;

a magnetic head adapted to receive pulses;

means for moving a magnetic recording medium relative to said magnetic head;

and means for applying pulses from said first source to said magnetic head to magnetize said recording medium in one direction and from said second source to said magnetic head to magnetize said recording medium in the opposite direction while said recording medium is moved relative to said magnetic head, whereby a track of coded oppositely polarized pulses is formed on said recording medium.

14. A seismic prospecting system comprising a first recording system for making a first photographic seismogram of seismic waves received from the earth, a time marking device for marking a series of time marks on said first photographic seismogram to aid in determining the times of occurrence of events on said photographic seismogram, a second recording system operable substantially simultaneously with said first recording system and responsive to said seismic waves received from the earth for making a magnetic seismogram of said seismic waves, a time marking device for making a separably distinct series of magnetic impressions on said magnetic seismogram to aid in determining the times of occurrence of events on said magnetic seismogram, a coded pulse generator for producing two overlapping series of periodic electric pulses, said generator including means operative to produce a first coded series of periodic pulses of one polarity and means operative to produce a second coded series of periodic pulses of opposite polarity, said first and second series of periodic pulses being of different repetition rates respectively related to one another by a fixed multiple, means controlled by said coded pulse generator for operating said marking device to code the marks recorded on said first photographic seismogram in accordance with the coding of said series of pulses, means controlled by said coded pulse generator for operating said marking device to code the separably distinct impressions recorded on said magnetic seismogram in accordance with the coding of said series of pulses, means for transducing said magnetic seismogram to produce therefrom a second photographic seismogram of said received seismic waves, and means controlled by the magnetic record of said series of separably distinct coded magnetic impressions on said magnetic seismogram for recording similarly coded time marks on said second photographic seismogram whereby the timing of related events on said first and second photographic seismograms may be coordinated.

References Cited in the file of this patent

UNITED STATES PATENTS

| | | |
|---|---|---|
| 1,098,932 | Akimoff | June 2, 1914 |
| 2,375,950 | Schlesinger | May 15, 1945 |
| 2,427,421 | Rieber | Sept. 16, 1947 |
| 2,496,392 | Hasbrouk | Feb. 7, 1950 |
| 2,578,133 | Hawkins | Dec. 11, 1951 |
| 2,607,035 | Levine | Aug. 12, 1952 |
| 2,620,890 | Lee | Dec. 9, 1952 |
| 2,626,004 | Hasbrook | Jan. 20, 1953 |
| 2,774,646 | Phelps | Dec. 18, 1956 |
| 2,803,809 | Tilley | Aug. 20, 1957 |

OTHER REFERENCES

"Geophysics," vol. 17, issue 4, pages 721–738, published in October 1952.

"Electronics," May 1955, pages 160–165.